United States Patent
Miyashita et al.

(10) Patent No.: US 8,209,968 B2
(45) Date of Patent: Jul. 3, 2012

(54) HYBRID VEHICLE AND METHOD OF CONTROLLING SAME

(75) Inventors: Shigeki Miyashita, Susono (JP); Hiroyuki Hokuto, Numazu (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 547 days.

(21) Appl. No.: 12/376,984

(22) PCT Filed: Sep. 14, 2007

(86) PCT No.: PCT/IB2007/002661
§ 371 (c)(1),
(2), (4) Date: Feb. 10, 2009

(87) PCT Pub. No.: WO2008/032195
PCT Pub. Date: Mar. 20, 2008

(65) Prior Publication Data
US 2010/0162686 A1    Jul. 1, 2010

(30) Foreign Application Priority Data
Sep. 15, 2006 (JP) .................... 2006-250914

(51) Int. Cl.
*B60W 20/00* (2006.01)
*B60W 10/06* (2006.01)
*B60K 6/24* (2007.10)
*F02D 41/02* (2006.01)
*F02D 41/30* (2006.01)

(52) U.S. Cl. ................................................. 60/301

(58) Field of Classification Search ............. 180/65.25, 180/275; 60/301
See application file for complete search history.

(56) References Cited

U.S. PATENT DOCUMENTS

| | | | |
|---|---|---|---|
| 6,109,025 A | 8/2000 | Murata et al. | |
| 6,570,265 B1 | 5/2003 | Shiraishi et al. | |
| 6,700,213 B1 * | 3/2004 | Wakashiro et al. | 290/40 C |
| 2002/0038654 A1 | 4/2002 | Sasaki et al. | |

FOREIGN PATENT DOCUMENTS

| | | |
|---|---|---|
| EP | 0 943 790 | 9/1999 |
| EP | 1 083 319 | 3/2001 |
| EP | 1 195 510 | 4/2002 |
| JP | 9 280085 | 10/1997 |
| JP | 2000 130213 | 5/2000 |
| JP | 2002 138877 | 5/2002 |
| JP | 2003 209906 | 7/2003 |
| JP | 2005 69029 | 3/2005 |

* cited by examiner

*Primary Examiner* — Kenneth Bomberg
*Assistant Examiner* — Jason Sheppard
(74) *Attorney, Agent, or Firm* — Oblon, Spivak, McClelland, Maier & Neustadt, L.L.P.

(57) ABSTRACT

A hybrid vehicle including an engine, a generator capable of generating power by being driven by the engine, an electric motor capable of running on power supplied from the generator, a power split device that transmits output from the engine to a driving wheel and the generator and also transmits output from the electric motor to the driving wheel, and a main ECU that controls an output ratio of the engine and an output ratio of the electric motor using the power split device according to the running state of the vehicle. When the operating mode of the engine is switched between a lean burn operating mode and a stoichiometric burn operating mode, the main ECU selectively increases and decreases the output ratio of the electric motor so that the total output, which is the combined output of the engine and the electric motor, is constant.

6 Claims, 7 Drawing Sheets

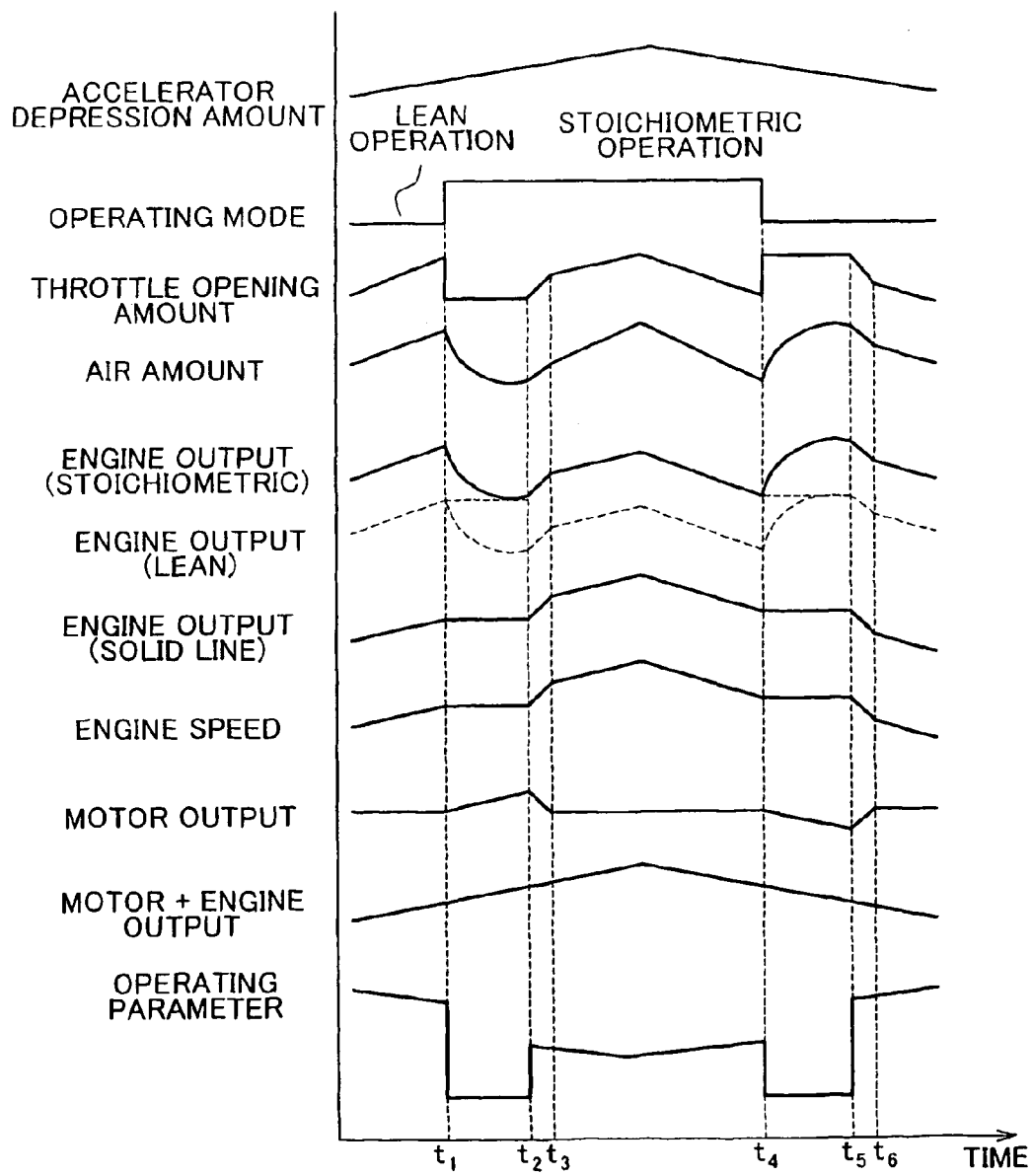

HYBRID VEHICLE AND METHOD OF CONTROLLING SAME

BACKGROUND OF THE INVENTION

1. Field of the Invention

The invention relates to a hybrid vehicle capable of running using an engine and an electric motor as power sources, and a method of controlling the same.

2. Description of the Related Art

In recent years hybrid vehicles, which are provided with both an engine that outputs torque generated by burning fuel and an electric motor that outputs torque by receiving a supply of power, have come to be used. These vehicles are capable of running by transmitting the torque from the engine and the electric motor to the wheels, and can be driven in any one of several modes by driving or stopping the engine and the electric motor depending on the running state. For example, the wheels can be driven using only the torque from the engine or only the torque from the electric motor. Alternatively, the wheels can be driven using the torque from both the engine and the electric motor. The electric motor can be driven using power (electricity) stored in a battery. When the state-of-charge (SOC) of the battery drops, the engine drives a generator to charge the battery.

In an in-cylinder injection type engine used in this kind of hybrid vehicle, stratified-charge combustion with a lean air-fuel ratio is achieved by injecting fuel into the combustion chamber during the compression stroke, and homogeneous combustion with a stoichiometric air-fuel ratio is achieved by injecting fuel into the combustion chamber during the intake stroke to form a uniform air-fuel mixture. For example, stratified-charge combustion is achieved in the low load operating region of the internal combustion engine by opening an intake valve during the intake stroke of the piston such that air is drawn from an intake port into the combustion chamber where it is compressed during the compression stroke. Fuel is then injected into this high pressure air and the two mix. The resultant air-fuel ratio mixture is led to a spark plug where it is ignited. Meanwhile, homogeneous combustion is achieved in the mid and high load operating regions of the internal combustion engine by opening the intake valve during the intake stroke of the piston such that air is drawn from the intake port into the combustion chamber. As the air is drawn in, fuel is also injected such that an air-fuel mixture is formed which disperses throughout the entire combustion chamber. This dispersed air-fuel mixture is then ignited by a spark plug and burns uniformly throughout the entire combustion chamber.

Japanese Patent Application Publication No. 2005-069029 (JP-A-2005-069029), for example, describes one such hybrid vehicle. Also, Japanese Patent Application Publication No. 2000-130213 (JP-A-2000-130213), for example, describes an in-cylinder injection type engine.

With the engine of the related art described above, when the operating mode changes according to the operating state between an operating mode that realizes stratified-charge combustion with a lean air-fuel ratio and an operating mode that realizes homogeneous combustion with the stoichiometric air-fuel ratio, an operating parameter such as the intake air amount or the ignition timing or the like is changed according to the change in the air-fuel ratio in order to compensate so that the actual output torque does not vary from the torque required by the driver. However, the engine torque adjustment when the air-fuel ratio is changed temporarily becomes off, at which time a shock is generated that may adversely affect drivability.

JP-A-2000-130213 also describes a control apparatus for a lean burn engine. With this control apparatus, even if an opening amount command value output to a throttle actuator is increased or decreased in a stepped manner when a condition for executing lean burn is satisfied or not satisfied, there is a time lag with the throttle actuator, as well as a response delay of the air (due to inertia and distance between the throttle and the combustion space). Therefore, with the control apparatus of the lean burn engine described in JP-A-2000-130213, the shifts in the target air-fuel ratio, ignition timing, and the injection timing are synchronized with the time lag and the response delay of the air. However, the maladjustment of the engine torque when the air-fuel ratio is changed is often due not only to response delays and the like of devices such as an electronic throttle device, but also to secular variation of these devices and deviations in the intake air temperature, as well as differences in the combustion rate due to the temperature difference of the residual gasses. Therefore, this maladjustment of the engine torque is unable to be properly compensated for and as a result, a shock is generated which adversely affects drivability.

SUMMARY OF THE INVENTION

This invention provides a hybrid vehicle that aims to improve drivability by reducing the shock generated by a fluctuation in torque that occurs when an operating mode is changed, and a method of controlling the same.

A first aspect of the invention relates to a hybrid vehicle that includes an engine; an electric motor; a power transmitting portion that transmits output from the engine to a driving wheel and transmits output from the electric motor to the driving wheel; an output control portion that controls an output ratio of the engine and an output ratio of the electric motor using the power transmitting portion according to a running state of the vehicle; and an operating mode switching portion that switches an operating mode of the engine between a lean burn operating mode in which an air-fuel ratio of the engine is lean and a stoichiometric burn operating mode in which the air-fuel ratio of the engine is near a stoichiometric air-fuel ratio. When the operating mode of the engine is switched by the operating mode switching portion, the output control portion selectively increases and decreases the output ratio of the electric motor such that a total output of the engine and the electric motor, which is the combined output of the engine and the electric motor, is constant.

In the first aspect, the output control portion may selectively increase and decrease the output ratio of the electric motor according to the operating modes before and after the operating mode is switched by the operating mode switching portion, and the output of the electric motor.

In this structure, when the operating mode is switched from the lean burn operating mode to the stoichiometric burn operating mode by the operating mode switching portion, the output control portion may increase the output ratio of the electric motor.

Also in the foregoing structure, when the operating mode is switched from the stoichiometric burn operating mode to the lean burn operating mode by the operating mode switching portion, the output control portion may decrease the output ratio of the electric motor.

Also in the foregoing structure, when the operating mode of the engine is switched by the operating mode switching portion and the output control portion selectively increases and decreases the output of the electric motor, the timing at which the increase or decrease of the output of the electric motor is started may be offset with respect to the timing at which the operating mode is switched by a predetermined period of time that is set according to the running state of the vehicle.

In the foregoing structure, a $NO_X$ storage reduction catalyst may also be provided in an exhaust passage of the engine, and the operating mode switching portion may also switch the operating mode selectively to and from a rich burn operating mode in which the air-fuel ratio of the engine is rich. Further, the output control portion may increase the output ratio of the electric motor, when the operating mode switching portion executes rich spike control that reduces $NO_X$ stored in the $NO_X$ storage reduction catalyst and recovers the $NO_X$ storage reduction catalyst by switching the operating mode to the rich burn operating mode.

In this structure, a three-way catalyst may also be provided upstream, in the direction in which exhaust gas flows, of the $NO_X$ storage reduction catalyst in the exhaust passage of the engine. The output control portion may delay the timing at which the increases of the output of the electric motor with respect to the timing at which the operating mode is switched by a predetermined period of time, when the operating mode switching portion executes the rich spike control of the $NO_X$ storage reduction catalyst by switching the operating mode to the rich burn operating mode.

In the foregoing structure, a three-way catalyst may also be provided upstream, in the direction in which exhaust gas flows, of the $NO_X$ storage reduction catalyst in the exhaust passage of the engine, as described above. In this case, however, the output control portion may advance the timing at which the increases of the output of the electric motor is started with respect to the timing at which the operating mode is switched by a predetermined period of time, when the operating mode switching portion cancels the rich spike control of the $NO_X$ storage reduction catalyst and switches the operating mode from the rich burn operating mode to one of the lean burn operating mode and the stoichiometric burn operating mode.

In the foregoing structure, the predetermined period of time may be set based on at least giving priority to a demand for exhaust gas purifying efficiency rather than to a demand for drivability.

In the foregoing structure, when the operating mode is switched by the operating mode switching portion, the output control portion may make the speed of the engine constant for a predetermined period of time and selectively increase and decrease the output of the electric motor.

In this structure, when the operating mode is switched from the lean burn operating mode to the stoichiometric burn operating mode by the operating mode switching portion, the output control portion may increase the output of the electric motor while keeping the speed of the engine constant.

In the foregoing structure, when the operating mode is switched from the stoichiometric burn operating mode to the lean burn operating mode by the operating mode switching portion, the output control portion may decrease the output of the electric motor while keeping the speed of the engine constant.

Also in the foregoing structure, the output control portion may selectively increase and decrease the output of the electric motor to change the total output of the engine and the electric motor to match a demand of a driver.

In the foregoing structure, after the operating mode is switched by the operating mode switching portion, the output control portion may decrease or increase the output of the electric motor according to the increase or decrease of the output of the engine such that the total output of the engine and the electric motor remains constant.

Also in the foregoing structure, when the operating mode is switched by the operating mode switching portion and the output of the electric motor is near an output upper limit of the electric motor, the output control portion may decrease the output ratio of the electric motor before the operating mode is switched.

A second aspect of the invention relates to a control method of a hybrid vehicle provided with an engine; an electric motor; power transmitting means for transmitting output from the engine to a driving wheel and transmitting output from the electric motor to the driving wheel; and output controlling means for controlling an output ratio of the engine and an output ratio of the electric motor using the power transmitting means according to a running state of the vehicle, which switches an operating mode of the engine between a lean burn operating mode in which an air-fuel ratio of the engine is lean and a stoichiometric burn operating mode in which the air-fuel ratio of the engine is near a stoichiometric air-fuel ratio. This control method selectively increases and decreases, when the operating mode of the engine is switched, the output ratio of the electric motor such that a total output of the engine and the electric motor, which is the combined output of the engine and the electric motor, is constant.

According to the hybrid vehicle of the forgoing structures, even if the output of the engine fluctuates, the total output is always kept constant by appropriately increasing or decreasing the output ratio of the electric motor when the operating mode of the engine is switched so shock generated by a fluctuation in output when the operating mode is changed is reduced, thereby improving drivability.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 7 is a time chart showing a change in the output ratios of an engine and an electric motor in a hybrid vehicle according to a fourth example embodiment.

DETAILED DESCRIPTION OF EMBODIMENTS

In the following description and the accompanying drawings, example embodiments of the hybrid vehicle according to the invention will be described in more detail with reference to the accompanying drawings. It is to be understood, however, that the invention is not limited to these example embodiments.

Figure 4:
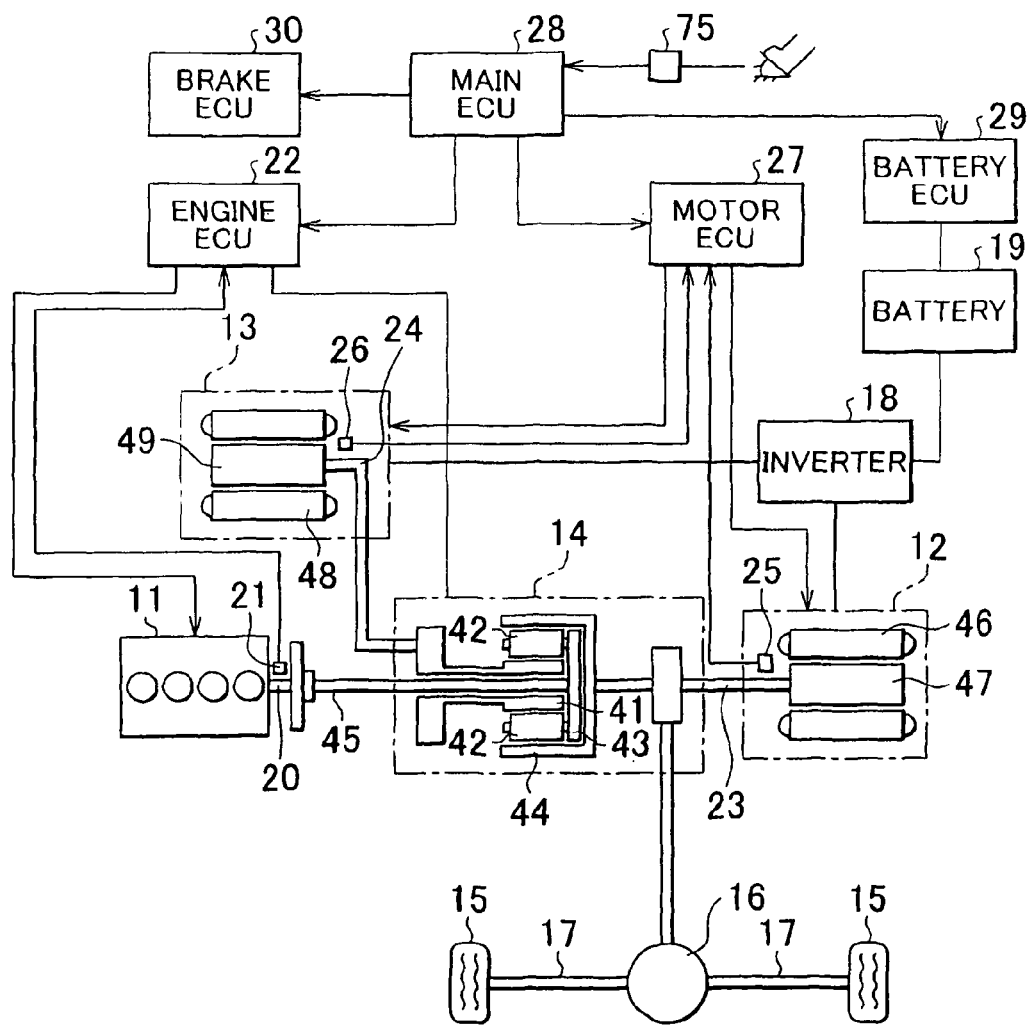
FIG. 4 is a block diagram schematically showing the hybrid vehicle according to the first example embodiment.

First, the overall structure of a hybrid vehicle according to a first example embodiment will be described in detail. As shown in FIG. 4, the hybrid vehicle according to the first example embodiment is provided with an engine 11 and an electric motor (motor-generator) 12 as power sources. The hybrid vehicle is also provided with a generator (motor-generator) 13 that is driven by output from the engine 11 to generate electricity. The engine 11, the electric motor 12, and the generator 13 are all connected together by a power split device (power transmitting means) 14. This power split device 14 divides the output from the engine 11 between the generator 13 and driving wheels 15 and also transmits output from the electric motor 12 to the driving wheels 15. The power split device 14 also functions as a transmission with regard to the driving force that is transmitted to the driving wheels 15 via reduction gears 16 and drive shafts 17.

The electric motor 12 is an alternating current synchronous electric motor that is driven by AC (alternating-current) power. An inverter 18 converts the power stored in a battery 19 from DC (direct-current) to AC and supplies it to the electric motor 12. The inverter 18 also converts the power generated by the generator 13 from AC to DC and stores it in the battery 19. Basically the generator 13 also has generally the same structure as the electric motor 12 described above, and thus is structured as an alternating current synchronous electric motor. In this case, the electric motor 12 mainly outputs driving force while the generator 13 mainly generates electricity by being driven by output from the engine 11.

Also, although the electric motor 12 mainly generates driving force, it can also function as a generator by generating electricity (regenerative power generation) using the rotation of the driving wheels 15. At this time, a brake (i.e., regenerative braking) is applied to the driving wheels 15 so the vehicle can be braked by a combination of this brake and a foot brake or an engine brake. On the other hand, although the generator 13 mainly generates electricity by being driven by output from the engine 11, it can also function as an electric motor that is powered by the battery 19 via the inverter 18 and used to drive the driving wheels 15.

A crank position sensor 21 that detects a crank angle is provided on a crankshaft 20 of the engine 11. This crank position sensor 21 is connected to an engine ECU 22 which determines the stroke, i.e., intake stroke, compression stroke, expansion (combustion) stroke, and exhaust stroke, in each cylinder based on the detected crank angle, as well as calculates the engine speed. Also, a rotation sensor 25 that detects the rotational position and rotation speed of drive shaft 23 of the electric motor 12 is provided on the drive shaft 23. Similarly, a rotation sensor 26 that detects the rotational position and rotation speed of drive shaft 24 of the generator 13 is provided on the drive shaft 24. These rotation sensors 25 and 26 are both connected to a motor ECU 27. The rotation sensor 25 outputs signals indicative of the rotational position and rotation speed of the drive shaft 23 to the motor ECU 27, and the rotation sensor 26 outputs signals indicative of the rotational position and rotation speed of the drive shaft 24 to the motor ECU 27.

The power split device 14 described above is formed by a planetary gear unit. That is, this power split device (i.e., planetary gear unit) 14 has a sun gear 41, a plurality of planetary gears 42 arranged around this sun gear 41, a gear carrier 43 that retains these planetary gears 42, and a ring gear 44 arranged on the outer periphery of the planetary gears 42 The crankshaft 20 of the engine 11 is connected to the gear carrier 43 via a center shaft 45 such that output from the engine 11 is input to the gear carrier 43 of the planetary gear unit 14. Also, a stator 46 and a rotor 47 are housed inside the electric motor 12. The rotor 47 is connected to the ring gear 44 via a drive shaft 23. The rotor 47 and the ring gear 44 are connected to the reduction gears 16 via a gear unit, not shown. The reduction gears 16 transmit output that was input from the electric motor 12 to the ring gear 44 of the planetary gear unit 14, to the drive shafts 17. The electric motor 12 is constantly connected to the drive shafts 17.

Also, similar to the electric motor 12 described above, the generator 13 also houses a stator 48 and a rotor 49. The rotor 49 is connected to the sun gear 41 via the drive shaft 24 and a gear unit, not shown. That is, output from the engine 11 is split by the planetary gear unit 14 such that some can be input to the rotor 49 of the generator 13 via the sun gear 41 and some can be transmitted to the drive shafts 17 via the ring gear 44 and the like.

The entire planetary gear unit 14 can be used as a continuously variable transmission by controlling the rotation of the sun gear 41, which is done by controlling the amount of power generated by the generator 13. That is, output from the engine 11 or the electric motor 12 can be output to the drive shafts 17 after the speed of that output has been changed by the planetary gear unit 14. Also, the speed of the engine 11 can also be controlled by controlling the amount of power generated by the generator 13 (or the amount of power consumed when the generator is functioning as an electric motor). Incidentally, the rotation speeds of the generator 13 and the electric motor 12 are controlled by the motor ECU 27 controlling the inverter 18 referencing the output of the rotation sensors 25 and 26. As a result, the speed of the engine 11 can also be controlled.

The various controls described above are performed by a plurality of electronic control units (ECU). A main ECU 28 comprehensively controls the typical driving by the engine 11 and the driving by the electric motor 12 and the generator 13 as a hybrid vehicle. That is, the distribution of the output of the engine 11 and the output of the electric motor 12 and the generator 13 is set by the main ECU 28 according to the running state of the vehicle for the output demanded by the driver. Various control commands are output to the engine ECU 22 and the motor ECU 27 to control the engine 11, the electric motor 12, and the generator 13.

Also, the engine ECU 22 and the motor ECU 27 also output information regarding the engine 11, the electric motor 12, and the generator 13 to the main ECU 28. This main ECU 28 is also connected to a battery ECU 29 that controls the battery 19 and a brake ECU 30 that controls the brakes. The battery ECU 29 monitors the SOC of the battery 19 and when the SOC is insufficient, outputs a charge request command to the main ECU 28. Upon receiving this charge request, the main ECU 28 controls the generator 13 to generate power to charge the battery 19. The brake ECU 30 controls the braking of the vehicle, and together with the main ECU 28 controls regenerative braking by the electric motor 12.

Given the structure of hybrid vehicle in the example embodiment described above, the output required for the overall vehicle can be obtained while controlling the operating state of the engine 11 to a desired operating state by dividing the necessary output required for the overall vehicle while the hybrid vehicle is operating between the engine 11 and the electric motor 12 (generator 13).

Figure 1:
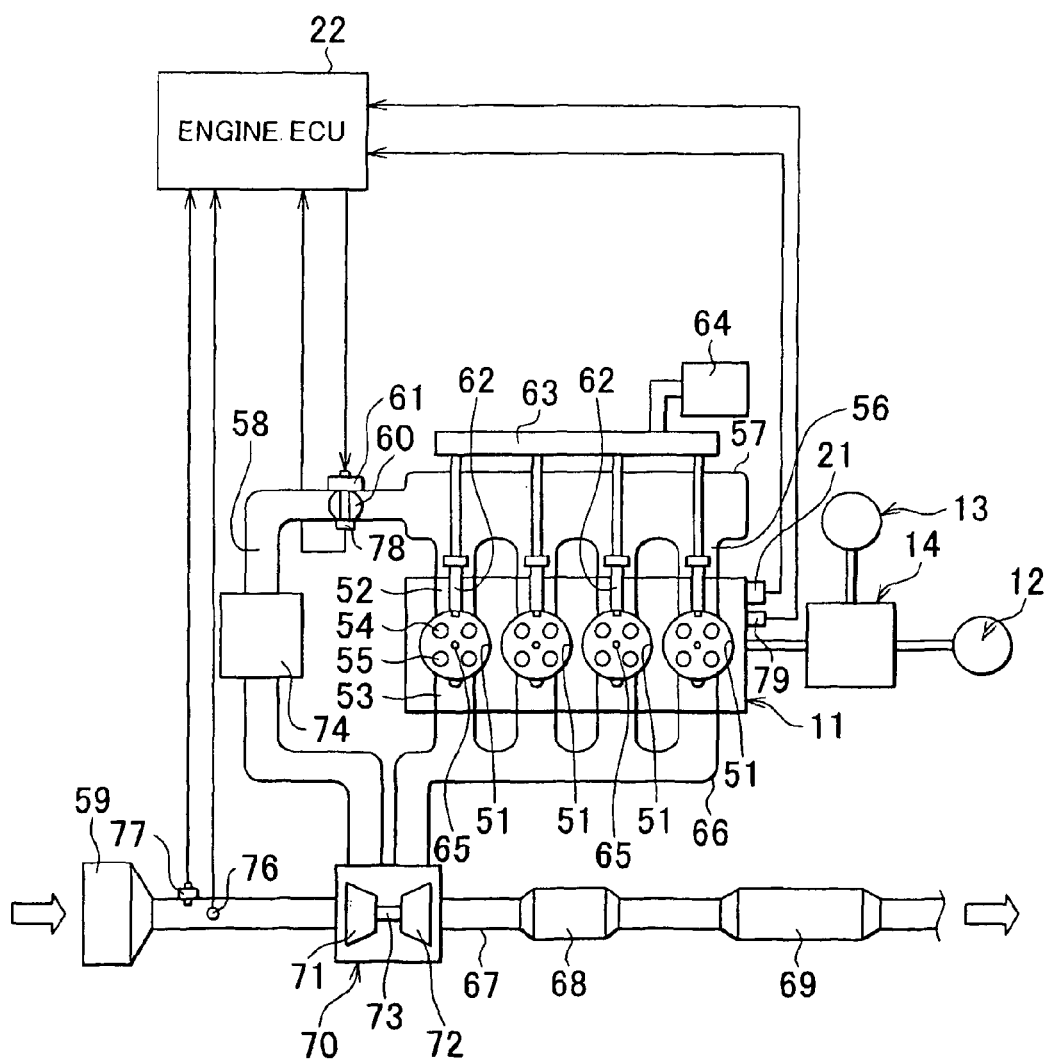
FIG. 1 is a block diagram schematically showing an engine that is applied to a hybrid vehicle according to a first example embodiment of the invention.

Next, the structure of the engine 11 in the hybrid vehicle of the first example embodiment described above will be described in detail. In the engine of the hybrid vehicle according to the first example embodiment, as shown in FIG. 1, the engine 11 is structured such that a cylinder head is fastened onto a cylinder block, not shown. Pistons are fit into a plurality of cylinder bores so as to be able to move up and down, and a crankshaft is rotatably supported in the lower portion of the cylinder block. Each piston is connected to the crankshaft via a connecting rod.

A combustion chamber 51 is formed by the cylinder block, the cylinder head, and the piston. An input port 52 and an exhaust port 53 are provided facing one another and open to the combustion chamber 51. The lower end portion of an intake valve 54 is positioned in the intake port 52 and the lower end portion of an exhaust valve 55 is positioned in the exhaust port 53. The intake valve 54 and the exhaust valve 55 are movably supported in their axial direction and urged in a direction in which they close the intake port 52 and the exhaust port 53, respectively. Also, an intake camshaft and an exhaust camshaft are rotatably supported on the cylinder head such that an intake cam contacts the upper end portion of the intake valve 54 and an exhaust cam contacts the upper end portion of the exhaust valve 55.

Accordingly, when the intake camshaft and the exhaust camshaft rotate in synch with the engine 11, the intake cam and the exhaust cam make the intake valve 54 and the exhaust valve 55 move up and down at a predetermined timing. As the intake valve 54 and the exhaust valve 55 move up and down, the intake port 52 and the exhaust port 53 open and close, thereby allowing and preventing communication between the intake port 52 and the combustion chamber 51, and between the exhaust port 54 and the combustion chamber 51.

The intake port 52 is connected via an intake manifold 56 to surge tank 57 which is connected to an intake pipe 58. An air cleaner 59 is mounted to an air inlet of this intake pipe 58. An electronic throttle device 61 that has a throttle valve 60 is provided downstream of the air cleaner 59.

Also, fuel injectors 62 that inject fuel (gasoline) directly into the cylinders 51 at a high pressure are mounted to the cylinder head and connected to a delivery pipe 63. Fuel of a predetermined pressure can be supplied from a high pressure fuel pump 64 to the delivery pipe 63. Also, a spark plug 65 that ignites an air-fuel mixture is mounted above the combustion chamber 51 in the cylinder head.

Meanwhile, the exhaust port 53 is connected via an exhaust manifold 66 to an exhaust pipe 67. A three-way catalyst 68 and a $NO_X$ storage reduction catalyst 69 are mounted in this exhaust pipe (exhaust passage) 67. The three-way catalyst 68 serves to simultaneously purify HC, CO, and $NO_X$ in the exhaust gas by a redox (oxidation-reduction) reaction when the exhaust gas air-fuel ratio is at the stoichiometric air-fuel ratio. The $NO_X$ storage reduction catalyst 69 stores $NO_X$ in the exhaust gas when the exhaust gas air-fuel ratio is lean and releases the stored $NO_X$ when the engine is operating in the stoichiometric burn region or rich burn region in which the oxygen concentration in the exhaust gas is lower, and reduces the released $NO_X$ using fuel as an added reducing agent.

The engine 11 is also provided with a turbocharger 70. This turbocharger 70 is structured such that a compressor 71 provided on the intake pipe 58 side and a turbine 72 provided on the exhaust pipe 67 side are integrally connected by a connecting shaft 73. An intercooler 74 that cools intake air that has been compressed and heated by the compressor 71 is provided in the intake pipe 58 downstream of the compressor 71 of the turbocharger 70 and upstream of the electronic throttle device 61 (throttle valve 60).

In the hybrid vehicle in this example embodiment, as shown in FIGS. 1 and 4, the main ECU 28 controls the engine 11 via the engine ECU 22, and also controls the electric motor 12 and the generator 13 via the motor ECU 27, according to the demand of the driver. That is, an accelerator position sensor 75 which detects the angle of an accelerator pedal is connected to the main ECU 28 and outputs a signal indicative of the detected accelerator depression amount to the main ECU 28. The main ECU 28 sets the required output from this accelerator depression amount, and then sets a power distribution ratio between the engine 11 and the electric motor 12 (i.e., a ratio that determines how much of the total power that is output is to be generated by the engine and how much of the total power that is output is to be generated by the electric motor) to achieve maximum efficiency according to the operating (i.e., running or stopped) state of the vehicle. The engine ECU 22 controls the engine 11 and the motor ECU 27 controls the electric motor 12.

For example, in a region where engine efficiency is poor such as when the vehicle is taking off from a standstill or running at low or medium speeds, a fuel cut is performed or the engine 11 is stopped and the driving wheels 15 are driven using only the electric motor 12. During normal running, the output from the engine 11 is divided and transmitted along two paths by the power split device 14. That is, some of the power is sent to the generator 13 to generate electricity which is then used to drive the electric motor 12, which in turn drives the driving wheels 15, while the rest of the power is used to directly drive the driving wheels 15. Thus, the vehicle is run using both the engine 11 and the electric motor 12. During sudden acceleration (during a high load), in addition to the control for normal running, the electric motor 12 also receives power from the battery 19, which gives it more power with which to drive the driving wheels 15. During deceleration and braking, the driving wheels 15 conversely drive the electric motor 12, causing the electric motor 12 to function as a generator as well as a regenerative brake, and the recovered power is used to charge the battery 19. When charging the battery 19, the output from the engine 11 is sent to the generator 13 via the power split device 14 to generate electricity which is then stored in the battery 19.

The engine ECU 22 can control the fuel injection timing of the fuel injectors 62 and the ignition timing of the spark plugs 65 and the like. The engine ECU 22 sets the fuel injection quantity, the injection timing, and the ignition timing and the like based on the detected intake air amount, the intake air temperature, the throttle opening amount, the accelerator depression amount (i.e., the required engine output), the engine speed, and the coolant temperature, and the like. That is, as shown in FIG. 1, an airflow sensor 76 and an intake air temperature sensor 77 are mounted on the upstream side of the intake pipe 58. The airflow sensor 76 and the intake air temperature sensor 77 output signals indicative of the measured intake air amount and the intake air temperature to the engine ECU 22. Also, a throttle position sensor 78 is provided with the electronic throttle device 61. This throttle position sensor 78 also outputs a signal indicative of the current throttle opening amount to the engine ECU 22. Further, a coolant temperature sensor 79 is provided in the cylinder block. This coolant temperature sensor 79 outputs a signal indicative of the detected engine coolant temperature to the engine ECU 22.

Also, in this example embodiment, the engine ECU 22 serves as an operating mode switching portion and can switch the operating mode of the engine 11 between a lean burn operating mode and a stoichiometric burn operating mode depending on the operating state of the engine 11. The lean burn operating mode realizes stratified-charge combustion with a lean air-fuel ratio by injecting fuel into the combustion chamber 51 during the compression stroke of the engine 11. The stoichiometric burn operating mode realizes homogeneous combustion with a stoichiometric air-fuel ratio by injecting fuel into the combustion chamber 51 during the intake stroke so that a uniform air-fuel mixture is formed.

Figure 2:
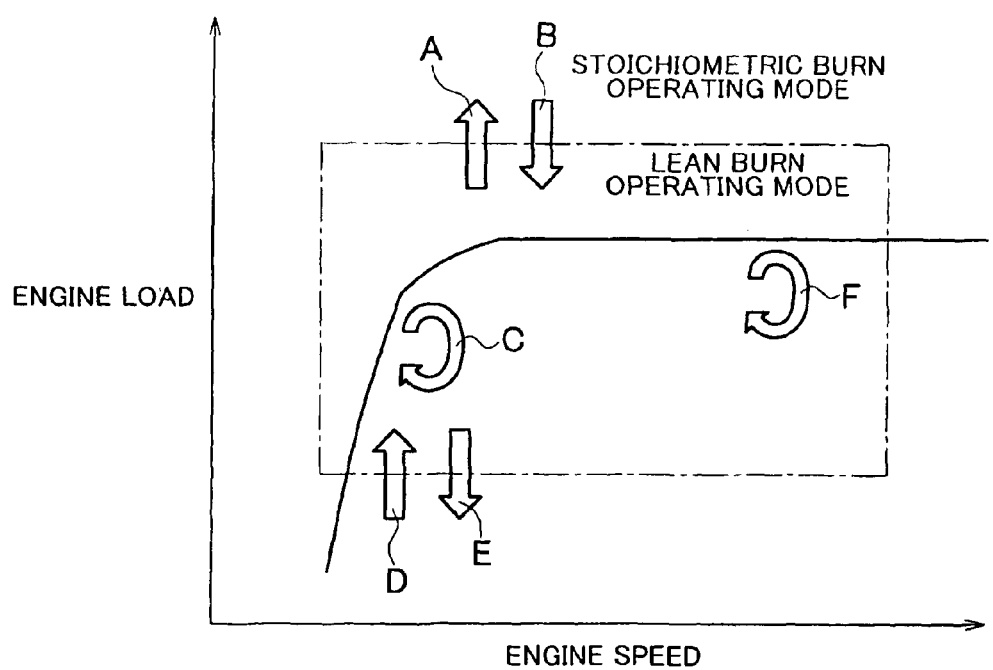
FIG. 2 is a graph showing an operating mode of the engine in the first example embodiment.

That is, as shown in FIG. 2, the engine ECU 22 sets an optimum line (shown by the solid line in the drawing) along which the engine load increases according to an increase in engine speed, as well as sets the lean burn operating mode (the area enclosed by the alternate long and short dash line) and the stoichiometric burn operating mode (the remaining area). On this kind of engine operating mode map, stratified-charge combustion is performed when the engine is operating in the lean burn operating mode. In this case, air from the intake port 52 is drawn into the combustion chamber 51 when the intake valve 54 opens during the intake stroke. The air that was drawn in is then compressed during the compression stroke. Fuel is then injected from the fuel injector 62 into this high pressure air and the two mix, forming an air-fuel mixture which is lead to the spark plug 65, ignited, and burned. On the other hand, homogeneous combustion is performed when the engine is operating in the stoichiometric burn operating mode. In this case, air from the intake port 52 is drawn into the combustion chamber 51 when the intake valve 54 opens during the intake stroke, while fuel is injected into the combustion chamber 51 from the fuel injector 62. As a result, a uniform air-fuel mixture forms which is dispersed throughout the entire combustion chamber 51. This dispersed air-fuel mixture is then ignited by the spark plug 65 and burns uniformly throughout the entire combustion chamber 51.

In this kind of engine 11, when the operating mode is changed between the lean burn operating mode and the stoichiometric burn operating mode, an operating parameter such as the intake air amount or the ignition timing or the like is changed according to the change in the air-fuel ratio in order to compensate so that the actual engine output does not vary from the required engine output that was set by the main ECU 28. However, the adjustment of the engine torque when the air-fuel ratio is changed ends up being off due not only to response delays and the like of devices such as an electronic throttle device 61, but also to secular variation of these devices and deviations in the intake air temperature. The adjustment is also temporarily off due to differences in the combustion rate which are caused by the temperature difference of residual gasses and the like. As a result, a shock is generated which adversely affects drivability.

Therefore, in the hybrid vehicle according to the first example embodiment, when the operating mode of the engine 11 is switched, the main ECU 28 that serves as the output control portion increases or decreases the output ratio of the electric motor 12 so that the total output, which is the combined output of the engine 11 and the electric motor 12, is constant. More specifically, when the operating mode of the engine 11 is switched from the lean burn operating mode to the stoichiometric burn operating mode, the main ECU 28 increases the output ratio of the electric motor 12. Also, when the operating mode of the engine 11 is switched from the stoichiometric burn mode to the lean burn operating mode, the main ECU 28 decreases the output ratio of the electric motor 12.

The control of the electric motor 12 when switching the operating mode is shown in detail in Table 1 below.

TABLE 1

| Operating pattern | Drivability demand | Exhaust gas purifying efficiency demand | Motor output ratio |
|---|---|---|---|
| A | Low | High | Large |
| B | High | None | Small |
| C | Medium | High | Large |

TABLE 1-continued

| Operating pattern | Drivability demand | Exhaust gas purifying efficiency demand | Motor output ratio |
|---|---|---|---|
| D | Low | None | Small |
| E | High | High | Large |
| F | Medium | High | Large |

As shown in FIG. 2 and Table 1, when the vehicle accelerates from steady operation, the load on the engine 11 is large with respect to the engine speed so the operating pattern is pattern A in which the operating mode switches from the lean burn operating mode to the stoichiometric burn operating mode. On the other hand, when the vehicle decelerates and returns to steady operation, the load on the engine 11 is small with respect to the engine speed so the operating pattern changes to pattern B in which the operating mode switches from the stoichiometric burn operating mode to the lean burn operating mode. Also, when the vehicle takes off from an idling state and moves to steady operation, the load on the engine 11 is large with respect to the engine speed so the operating pattern of the engine 11 changes to pattern D in which the operating mode switches from the stoichiometric burn operating mode to the lean burn operating mode. On the other hand, when the vehicle stops after steady operating and returns to the idling state, the load on the engine 11 decreases with respect to the engine speed so the operating pattern of the engine 11 changes to pattern E in which the operating mode switches from the lean burn operating mode to the stoichiometric burn operating mode. Then, during steady operation when there is almost no change in the load on the engine 11 regardless of the engine speed, the operating pattern of the engine 11 changes to pattern C or F in which the operating mode is maintained in the lean burn operating mode.

With operating pattern A when the vehicle is accelerating, the amount of exhaust gas increases so priority is given to the demand for exhaust gas purifying efficiency rather than the demand for drivability. Therefore, the main ECU 28 increases the output ratio of the electric motor 12. On the other hand, with operating pattern B when the vehicle is decelerating, the amount of exhaust gas decreases so priority is given to the demand for drivability rather than the demand for exhaust gas purifying efficiency. Therefore, the main ECU 28 reduces the output ratio of the electric motor 12. Also, with operating pattern D in which the vehicle is shifting into steady operation, the amount of harmful components in the exhaust gas decreases. Thus, with operating pattern D, both the demand for drivability and the demand for exhaust gas purifying efficiency decrease so the main ECU 28 reduces the output ratio of the electric motor 12. On the other hand, with operating pattern E in which the vehicle returns to an idling state, there is both a demand for drivability and a demand for exhaust gas purifying efficiency so the main ECU 28 increases the output ratio of the electric motor 12. With operating patterns C and F in which steady operation is maintained, priority is given to the demand for exhaust gas purifying efficiency rather than the demand for drivability so the main ECU 28 increases the output ratio of the electric motor 12.

That is, with the operating patterns A and E in which the operating mode of the engine 11 is switched from the lean burn operating mode to the stoichiometric burn operating mode, the amount of exhaust gas, as well as the amount of harmful components in the exhaust gas, increases. Therefore, the main ECU 28 increases the output ratio of the electric motor 12 and decreases the output ratio of the engine 11 to reduce the amount of exhaust gas and improve the exhaust gas purifying efficiency. On the other hand, with the operating patterns B and D in which the operating mode of the engine 11 is switched from the stoichiometric burn operating mode to the lean burn operating mode, the amount of exhaust gas, as well as the amount of harmful components in the exhaust gas, decreases. Therefore, the main ECU 28 decreases the output ratio of the electric motor 12 and increases the output ratio of the engine 11 to improve drivability. Also, with operating patterns C and F in which steady operation is maintained, the main ECU 28 increases the output ratio of the electric motor 12 and decreases the output ratio of the engine 11 to decrease the amount of exhaust gas and improve exhaust gas purifying efficiency.

Here, the control when switching the operating mode of the engine 11 in the hybrid vehicle according to this example embodiment will be described in detail based on the time chart in FIG. 3.

Figure 3:
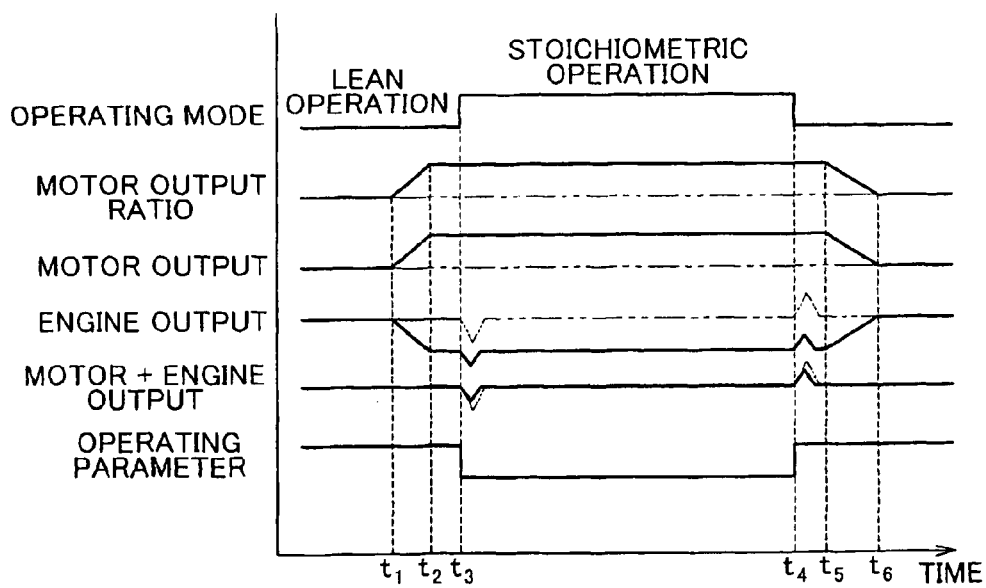
FIG. 3 is a time chart showing a change in the output ratios of an engine and an electric motor in the hybrid vehicle according to the first example embodiment.

In the operating mode switching control of the engine 11 in the hybrid vehicle of this example embodiment, when a command to switch the operating mode of the engine 11 is output as a result of a change in the running state (i.e., the output required by the driver) of the hybrid vehicle at time $t_1$, the main ECU 28 increases or decreases the output ratio of the electric motor 12 while the total output of the hybrid vehicle is kept constant, as shown in FIGS. 1, 3, and 4. In this case, the operating mode of the engine 11 switches from the lean burn operating mode to the stoichiometric burn operating mode so the output of the electric motor 12 is increased by increasing the output ratio of the electric motor 12, while the output of the engine 11 is decreased.

Then when the change in output from the engine 11 and the electric motor 12 is complete at time $t_2$, the operating mode of the engine 11 switches from the lean burn operating mode to the stoichiometric burn operating mode at time $t_3$. At time $t_3$, an operating parameter such as the intake air amount or the ignition timing is changed in order to change the air-fuel ratio. At this time, the adjustment of the output of the engine 11 when the air-fuel ratio is changed temporarily becomes off which results in a shock being generated. However, this shock is reduced because the output ratio of the electric motor 12 was increased and the output ratio of the engine 11 was decreased in advance. If the output ratios of the electric motor 12 and the engine 11 are not changed when the operating mode (i.e., the air-fuel ratio) is changed, a large shock will result, as shown by the alternate long and two short dashes line in FIG. 3.

Then when a command is output to switch the operating mode of the engine 11 due to a change in the running state (i.e., a change in the output required by the driver) of the hybrid vehicle at time $t_4$, the engine ECU 22 quickly switches the operating mode of the engine 11 from the stoichiometric burn operating mode to the lean burn operating mode. At time $t_4$ an operating parameter such as the intake air amount or the ignition timing is changed in order to change the air-fuel ratio. At this time, the adjustment of the output of the engine 11 when the air-fuel ratio is changed temporarily becomes off which results in a shock being generated. However, this shock is reduced because the output ratio of the electric motor 12 is already increased and the output ratio of the engine 11 is already decreased.

Then at time $t_5$, the output ratio of the electric motor 12 is increased or decreased while the total output of the hybrid vehicle is kept constant. Here, because the operating mode of the engine 11 is switched from the stoichiometric burn operating mode to the lean burn operating mode, the output of the electric motor 12 is decreased by reducing the output ratio of the electric motor 12, while the output ratio of the engine 11 is increased. This change in the output of the engine 11 and the electric motor 12 is then complete at time $t_6$.

As described above, this kind of hybrid vehicle according to the first example embodiment is provided with an engine 11, a generator 13 capable of generating power using at least some of the output from the engine 11, an electric motor 12 capable of running on power supplied from the generator 13, a power split device 14 that transmits output from the engine 11 to driving wheels 15 and the generator 13 and also transmits output from the electric motor 12 to the driving wheels 15, and a main ECU 28 that controls the output ratio of the engine 11 and the output ratio of the electric motor 12 using the power split device 14 according to the running state. The engine ECU 22 can switch the operating mode of the engine 11 between a lean burn operating mode in which the air-fuel ratio of the engine 11 is lean and a stoichiometric burn operating mode in which the air-fuel ratio is near the stoichiometric air-fuel ratio. When the operating mode of the engine 11 is switched, the main ECU 28 increases or decreases the output of the electric motor 12 so that the total output, which is the combined output of the engine 11 and the electric motor 12, is constant.

Therefore, when the operating mode of the engine 11 is switched, even if the output of the engine 11 fluctuates, the shock from that fluctuation can be reduced by increasing the output ratio of the electric motor 12, thus enabling the drivability to be improved. Also, when the operating mode of the engine 11 is switched, the amount of exhaust gas can be reduced, thereby improving the exhaust gas purifying efficiency, by increasing the output ratio of the electric motor 12.

Further, when the operating mode of the engine 11 is switched from the lean burn operating mode to the stoichiometric burn operating mode, the main ECU 28 increases the output ratio of the electric motor 12. Conversely, when the operating mode of the engine 11 is switched from the stoichiometric burn operating mode to the lean burn operating mode, the main ECU 28 decreases the output ratio of the electric motor 12.

When the operating mode of the engine 11 is switched from the lean burn operating mode to the stoichiometric burn operating mode, the amount of exhaust gas, as well as the amount of harmful components in the exhaust gas, increases. Therefore the output ratio of the electric motor 12 is increased and the output ratio of the engine 11 is decreased so that the amount of exhaust gas can be reduced and exhaust gas purifying efficiency can be improved. On the other hand, when the operating mode of the engine 11 is switched from the stoichiometric burn operating mode to the lean burn operating mode, the amount of exhaust gas, as well as the amount of harmful components in the exhaust gas, decreases. Therefore the output ratio of the electric motor 12 is decreased and the output ratio of the engine 11 is increased so that drivability can be improved.

Also, the $NO_X$ storage reduction catalyst 69 stores $NO_X$ in the exhaust gas when the exhaust gas air-fuel ratio is lean and releases the stored $NO_X$ in the stoichiometric burn range or rich burn range where the oxygen concentration in the exhaust gas is lower, and reduces the released $NO_X$ using fuel as an added reducing agent. However, when stored $NO_X$ is released and reduced using fuel, the exhaust gas purifying efficiency is better with smaller amounts of exhaust gas. Therefore, when executing rich spike control for the $NO_X$ storage reduction catalyst 69, the amount of exhaust gas can be reduced and the exhaust gas purifying efficiency can be improved by increasing the output ratio of the electric motor 12 and decreasing the output ratio of the engine 11.

Figure 5:
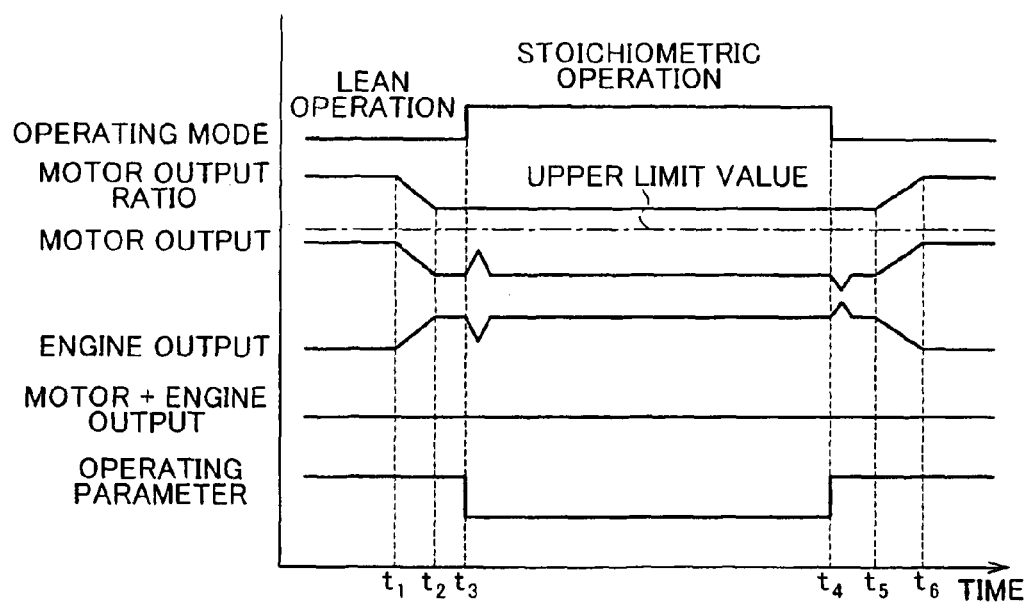
FIG. 5 is a time chart showing a change in the output ratios of an engine and an electric motor in a hybrid vehicle according to a second example embodiment.

FIG. 5 is a time chart showing the change in output ratios of an engine and an electric motor in a hybrid vehicle according to a second example embodiment. The overall structure of the hybrid vehicle in this second example embodiment is generally the same as that of the hybrid vehicle in the first example embodiment described above. Therefore, the second example embodiment will also be described with reference to FIGS. 1 and 4, and members that have the same function as they do in the first example embodiment will be denoted by the same reference numerals and redundant descriptions of those members will be omitted.

In the hybrid vehicle according to the second example embodiment, as shown in FIGS. 1 and 4, the main ECU 28 controls the engine 11 via the engine ECU 22, and also controls the electric motor 12 and the venerator 13 via the motor ECU 27. That is, the main ECU 28 sets the power distribution ratio between the engine 11 and the electric motor 12 (i.e., a ratio that determines how much of the total power that is output is to be generated by the engine and how much of the total power that is output is to be generated by the electric motor) to achieve maximum efficiency according to the accelerator depression amount and the running state of the vehicle. The engine ECU 22 controls the engine 11 and the motor ECU 27 controls the electric motor 12. Also, in this example embodiment, the engine ECU 22 can switch the operating mode of the engine 11, according to the operating state of the engine 11, between a lean burn operating mode operating mode that realizes stratified-charge combustion with a lean air-fuel ratio and a stoichiometric burn operating mode that realizes homogenous combustion with a stoichiometric air-fuel ratio.

In the hybrid vehicle according to this second example embodiment, when the operating mode of the engine 11 is switched, the main ECU 28 that serves as an output control portion increases or decreases the output ratio of the electric motor 12 so that the total output, which is the combined output of the engine 11 and the electric motor 12, is constant. More specifically, when the operating mode of the engine 11 is switched from the lean burn operating mode to the stoichiometric burn operating mode, the main ECU 28 increases or decreases the output ratio of the electric motor 12 to adjust for the shock generated in the engine 11 after first reducing the output radio of the electric motor 12. Also, when the operating mode of the engine 11 is switched from the stoichiometric burn mode to the lean burn operating mode, the main ECU 28 increases the output ratio of the electric motor 12 after first increasing or decreasing the output of the electric motor 12 to adjust for the shock generated in the engine 11.

That is, in the operating mode switching control of the engine 11 in the hybrid vehicle in this example embodiment, when a command to switch the operating mode of the engine 11 is output as a result of a change in the running state of the hybrid vehicle at time $t_1$, the main ECU 28 increases or decreases the output ratio of the electric motor 12 while the total output of the hybrid vehicle is kept constant, as shown in FIGS. 1, 4, and 5. In this case, the operating mode of the engine 11 switches from the lean burn operating mode to the stoichiometric burn operating mode so the output of the electric motor 12 is decreased by reducing the output ratio of the electric motor 12, while the output of the engine 11 is increased.

Then when the change in output from the engine 11 and the electric motor 12 is complete at time $t_2$, the operating mode of the engine 11 switches from the lean burn operating mode to the stoichiometric burn operating mode at time $t_3$. At time $t_3$, an operating parameter such as the intake air amount or the ignition timing is changed in order to change the air-fuel ratio.

At this time, the adjustment of the output of the engine 11 when the air-fuel ratio is changed temporarily becomes off which results in a shock being generated. However, this shock is negated by increasing or decreasing the output of the electric motor 12 to adjust for the shock so the shock in the total output is minimized or eliminated. In this case, when the output of the electric motor 12 in the lean burn operating mode is near its upper limit value, the electric motor 12 is unable to increase or decrease sufficient output for the shock that occurs with the adjustment of the output of the engine 11 so the output ratio of the electric motor 12 is decreased in advance.

Then when a command is output to switch the operating mode of the engine 11 due to a change in the running state of the hybrid vehicle at time $t_4$, the engine ECU 22 quickly switches the operating mode of the engine 11 from the stoichiometric burn operating mode to the lean burn operating mode. At time $t_4$ an operating parameter such as the intake air amount or the ignition timing is changed in order to change the air-fuel ratio. At this time, the adjustment of the output of the engine 11 when the air-fuel ratio is changed temporarily becomes off which results in a shock being generated. However, this shock is negated by increasing or decreasing the output of the electric motor 12 to adjust for the shock so a shock in the total output is minimized or eliminated.

Then at time $t_5$, the output ratio of the electric motor 12 is increased or decreased while the total output of the hybrid vehicle is kept constant. Here, because the operating mode of the engine 11 is switched from the stoichiometric burn operating mode to the lean burn operating mode, the output of the electric motor 12 is increased by increasing the output ratio of the electric motor 12, while the output of the engine 11 is decreased. This change in the output of the engine 11 and the electric motor 12 is then complete at time $t_6$.

As described above, in the kind of hybrid vehicle according to the second example embodiment, when the operating mode of the engine 11 is switched, the main ECU 28 increases or decreases the output of the electric motor 12 so that the total output, which is the combined output of the engine 11 and the electric motor 12, is constant. Mores specifically, when the operating mode of the engine 11 is switched, the output of the electric motor 12 is increased or decreased to adjust for the shock generated in the engine 11.

Accordingly, when the operating mode of the engine 11 is switched, the output of the electric motor 12 is increased or decreased to adjust for the shock generated in the engine 11 at that time, so that shock is negated. As a result, the shock in the total output is minimized or eliminated so drivability can be improved.

Also at this time, when the output of the electric motor 12 in the lean burn operating mode is near the upper limit value, sufficiently large output is unable to be increased or decreased for the shock generated by the adjustment of the output of the engine 11. Therefore, by reducing the output ratio of the electric motor 12 beforehand, the optimum output of the electric motor 12 can be increased or decreased according to the magnitude of the shock of the engine 11 that is generated when the operating mode of the engine 11 is switched. As a result, the shock can be appropriately minimized or eliminated.

Figure 6:
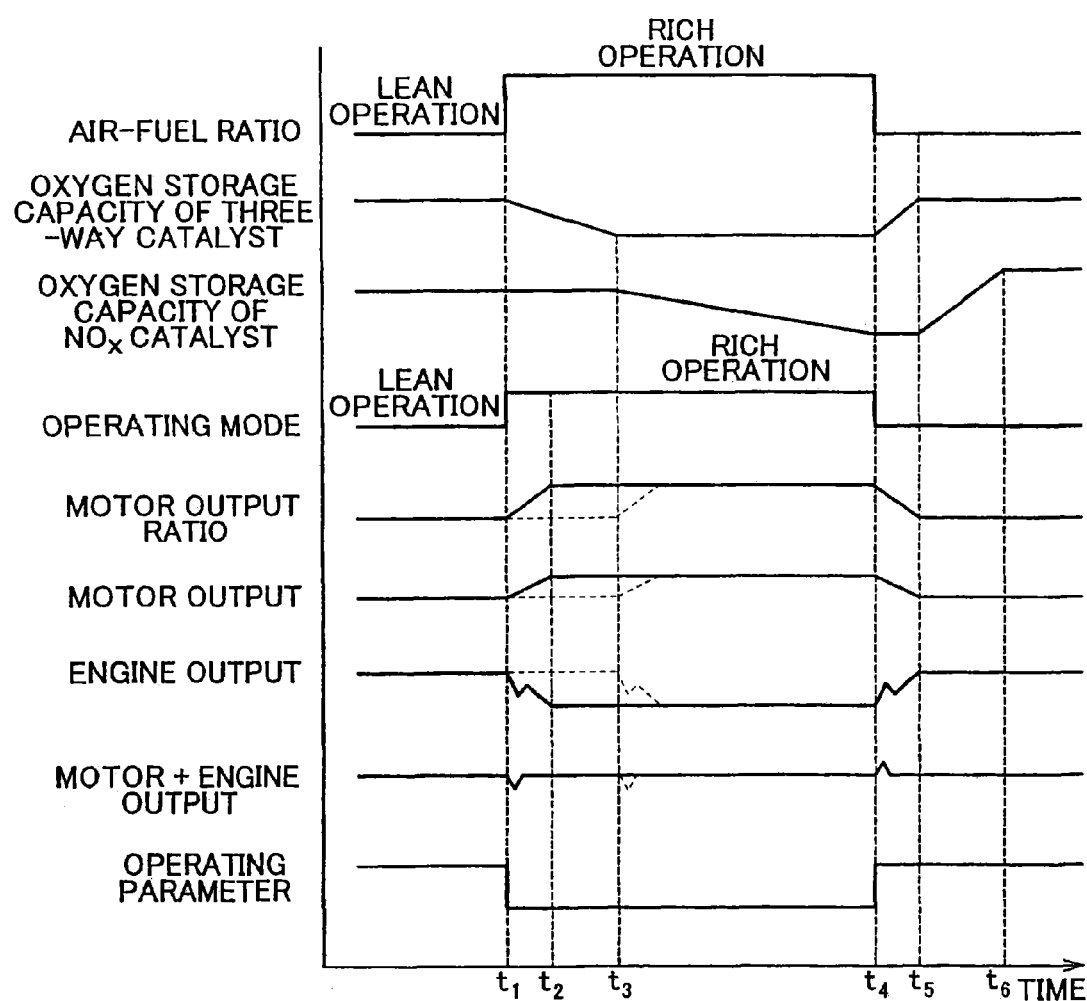
FIG. 6 is a time chart showing a change in the output ratios of an engine and an electric motor in a hybrid vehicle according to a third example embodiment.

FIG. 6 is a time chart showing the change in output ratios of an engine and an electric motor in a hybrid vehicle according to a third example embodiment. The overall structure of the hybrid vehicle in this third example embodiment is generally the same as that of the hybrid vehicle in the first example embodiment described above. Therefore, the third example embodiment will also be described with reference to FIGS. 1 and 4, and members that have the same function as they do in the first example embodiment will be denoted by the same reference numerals and redundant descriptions of those members will be omitted.

In the hybrid vehicle according to the third example embodiment, as shown in FIGS. 1 and 4, the main ECU 28 controls the engine 11 via the engine ECU 22, and also controls the electric motor 12 and the generator 13 via the motor ECU 27. That is, the main ECU 28 sets the power distribution ratio between the engine 11 and the electric motor 12 (i.e., a ratio that determines how much of the total power that is output is to be generated by the engine and how much of the total power that is output is to be generated by the electric motor) to achieve maximum efficiency according to the accelerator depression amount and the running state of the vehicle. The engine ECU 22 controls the engine 11 and the motor ECU 27 controls the electric motor 12. Also, in the engine 11 in this example embodiment, the engine ECU 22 can switch the operating mode of the engine 11, according to the operating state of the engine 11, between a lean burn operating mode that realizes stratified-charge combustion with a lean air-fuel ratio, a stoichiometric burn operating mode that realizes homogenous combustion with a stoichiometric air-fuel ratio, and a rich burn operating mode that realizes homogeneous combustion with a rich air-fuel ratio. By switching to this lean burn operating mode, rich spike control can be executed which reduces the $NO_X$ stored in the $NO_X$ storage reduction catalyst 69, and in doing so recovers the $NO_X$ storage reduction catalyst 69.

In the hybrid vehicle according to this third example embodiment, when the operating mode of the engine 11 is switched, the main ECU 28 that serves as an output control portion increases or decreases the output ratio of the electric motor 12 so that the total output, which is the combined output of the engine 11 and the electric motor 12, is constant. More specifically, when the operating mode of the engine 11 is switched from the lean burn operating mode to the stoichiometric burn operating mode or the rich burn operating mode, the main ECU 28 increases the output ratio of the electric motor 12. Also, when the operating mode of the engine 11 is switched from the stoichiometric burn mode or the rich burn operating mode to the lean burn operating mode, the main ECU 28 decreases the output ratio of the electric motor 12.

At this time, with the hybrid vehicle according to the third example embodiment, when rich spike control that reduces the $NO_X$ stored in the $NO_X$ storage reduction catalyst 69 and consequently recovers the $NO_X$ storage reduction catalyst 69 is executed by switching the operating mode of the engine 11, the main ECU 28 delays the timing at which the increase of the output of the electric motor 12 is started with respect to the timing at which the operating mode is switched by a predetermined period of time that is set in advance. That is, the main ECU 28 increases the output of the electric motor 12 a predetermined period of time after the operating mode is switched. The predetermined period of time is set in advance. On the other hand, when the rich spike control is cancelled by switching the operating mode of the engine 11, the main ECU 28 advances the timing at which increases of the output of the electric motor 12 is started with respect to the timing at which the operating mode is switched by a predetermined period of time that is set in advance. That is, the main ECU 28 increases the output of the electric motor 12 a predetermined period of time before the operating mode is switched. The predetermined period of time is set in advance.

The details of the control of the electric motor 12 when switching the operating mode are shown in Table 2 below. Operating patterns A to F are the same as those described in the first example embodiment with reference to FIG. 2.

TABLE 2

| Operating pattern | Drivability demand | Exhaust gas purifying efficiency demand | Motor output ratio | Timing at which output ratio is changed |
|---|---|---|---|---|
| A | Low | High | Large | Delayed |
| B | High | None | Small | Advanced |
| C | Medium | High | Large | Advanced |
| D | Low | None | Small | Advanced |
| E | High | High | Large | Delayed |
| F | Medium | High | Large | Delayed |

As shown in FIG. 2 and Table 2, when rich spike control is executed in operating patterns A and E in which the operating mode of the engine 11 switches from the lean burn operating mode to the stoichiometric burn operating mode or the rich burn operating mode, the reducing agents (CO and HC) in the exhaust gas are oxidized by oxygen stored in the three-way catalyst 68. As a result, a sufficient amount of rich exhaust gas for recovering the $NO_X$ storage reduction catalyst 69 may not be able to reach the $NO_X$ storage reduction catalyst 69 early on, and as a result, the $NO_X$ may not be able to be properly reduced early on. Therefore, the timing at which the increases of the output of the electric motor 12 is started (hereinafter also referred to as the "increase timing") is delayed by a predetermined period of time, which delays the decrease in the amount of exhaust gas so that the oxygen stored in the three-way catalyst 68 is consumed early on. As a result, the $NO_X$ purifying efficiency of the $NO_X$ storage reduction catalyst 69 improves.

On the other hand, when the rich spike control is cancelled in operating patterns B and D in which the operating mode of the engine 11 is switched from the stoichiometric burn operating mode or the rich burn operating mode to the lean burn operating mode, the three-way catalyst 68 stores oxygen early on, thus recovering its exhaust gas purifying function. Therefore, the timing at which the decreases of the output of the electric motor 12 is started is advanced by a predetermined period of time so the amount of exhaust gas increases earlier and oxygen is stored in the three-way catalyst 68 early on. As a result, the exhaust gas purifying efficiency of the three-way catalyst 68 and the $NO_X$ storage reduction catalyst 69 improves.

When rich spike control of the $NO_X$ reduction catalyst 69 is executed with operating pattern C in which the engine 11 is operating steadily at a low speed, the amount of exhaust gas is small so the timing at which the increases of the output of the electric motor 12 is started is advanced by a predetermined period of time. When rich spike control of the $NO_X$ storage reduction catalyst 69 is executed with operating pattern F in which the engine 11 is operating steadily at a high speed, the amount of exhaust gas is large so the timing at which the increases of the output of the electric motor 12 is started is delayed by a predetermined period of time.

That is, in the operating mode switching control of the engine 11 in the hybrid vehicle in this example embodiment, when a command to switch the operating mode of the engine 11 is output in order to execute rich spike control of the $NO_X$ storage reduction catalyst 69 at time $t_1$, the operating mode of the engine 11 is switched from the lean burn operating mode to the rich burn operating mode (or the stoichiometric burn operating mode) by changing the air-fuel ratio from lean to rich, as shown in FIGS. 1, 4, and 6. At time $t_1$, an operating parameter such as the intake air amount or the ignition timing is changed in order to change the air-fuel ratio. Also, while keeping the total output of the hybrid vehicle constant, the output of the electric motor 12 is increased by increasing the output ratio of the electric motor 12 while the output of the engine 11 is decreased.

Then when the change in output from the engine 11 and the electric motor 12 is complete at time $t_2$, the adjustment of the output of the engine 11 when the air-fuel ratio is changed temporarily becomes off which results in a shock being generated. However, the magnitude of this shock is reduced because the main ECU 28 increases the output ratio of the electric motor 12 and decreases the output ratio of the engine 11. Also, when the air-fuel ratio is changed from lean to rich at time $t_1$, the oxygen stored in the three-way catalyst 68 is reduced by the reducing agents (CO and HC) in the exhaust gas until the three-way catalyst 68 is depleted of all its stored oxygen at time $t_3$. As a result, the reducing agents reach the $NO_X$ storage reduction catalyst 69 and reduce the $NO_X$. That is, after the operating mode of the engine 11 is switched from the lean burn operating mode to the rich burn operating mode, the $NO_X$ storage reduction catalyst 69 can be properly recovered by increasing the output ratio of the electric motor 12.

Then when a command is output to switch the operating mode of the engine 11 in order to cancel the rich spike control of the $NO_X$ storage reduction catalyst 69 at time $t_4$, the operating mode of the engine 11 is switched from the rich burn operating mode to the lean burn operating mode. At time $t_4$ an operating parameter such as the intake air amount or the ignition timing is changed in order to change the air-fuel ratio. Also, while keeping the total output of the hybrid vehicle constant, the output of the electric motor 12 is decreased by decreasing the output ratio of the electric motor 12 while the output of the engine 11 is increased.

Then when the change in output from the engine 11 and the electric motor 12 is complete at time $t_5$, the adjustment of the output of the engine 11 when the air-fuel ratio is changed temporarily becomes off which results in a shock being generated. However, the magnitude of this shock is reduced because the output ratio of the engine 11 is still low. Also, when the air-fuel ratio is changed from rich to lean at time $t_4$, oxygen starts to be stored in the three-way catalyst 68. At time $t_5$ the three-way catalyst 68 becomes saturated with oxygen and oxygen starts to be stored by the $NO_X$ storage reduction catalyst 69. Then at time $t_6$, the $NO_X$ storage reduction catalyst 69 also becomes saturated with oxygen. That is, the exhaust gas purifying function of both the three-way catalyst 68 and the $NO_X$ storage reduction catalyst 69 can be properly restored by decreasing the output ratio of the electric motor 12 beforehand when the operating mode of the engine 11 is to be switched from the rich burn operating mode to the lean burn operating mode.

In this way, with the hybrid vehicle according to the third example embodiment, when the operating mode of the engine 11 is switched in order to execute or cancel rich spike control of the $NO_X$ storage reduction catalyst 69, the main ECU 28 increases or decreases the output of the electric motor 12 so that the total output, which is the combined output of the engine 11 and the electric motor 12, becomes constant.

Accordingly, when the operating mode of the engine 11 is switched, even if the output of the engine 11 fluctuates, the shock from that fluctuation can be reduced by increasing the output ratio of the electric motor 12, thus enabling the drivability to be improved. Also, increasing the output ratio of the electric motor 12 when the operating mode of the engine 11 is switched reduces the amount of exhaust gas, which enables the exhaust gas purifying efficiency to be improved. Further, increasing the output ratio of the electric motor 12 when executing rich spike control of the $NO_X$ storage reduction catalyst 69 reduces the amount of exhaust gas discharged from the engine 11, which enables the exhaust gas purifying efficiency to be improved.

Also, when the operating mode of the engine 11 is switched from the lean burn operating mode to the rich burn operating mode in order to execute rich spike control of the $NO_X$ storage reduction catalyst 69, the main ECU 28 delays the timing at which the increases of the output ratio of the electric motor 12 is started. On the other hand, when the operating mode of the engine 11 is switched from the rich burn operating mode to the lean burn operating mode in order to cancel the rich spike control of the $NO_X$ storage reduction catalyst 69, the main ECU 28 advances the timing at which the decreases of the output of the electric motor 12 is started.

Accordingly, when executing rich spike control of the $NO_X$ storage reduction catalyst 69, the $NO_X$ storage reduction catalyst can be properly recovered by increasing the output ratio of the electric motor 12 after switching the operating mode of the engine 11 from the lean burn operating mode to the rich burn operating mode. On the other hand, when cancelling the rich spike control of the $NO_X$ storage reduction catalyst 69, the exhaust gas purifying function of both the three-way catalyst 68 and the $NO_X$ storage reduction catalyst 69 can be properly recovered by decreasing the output ratio of the electric motor 12 before switching the operating mode of the engine 11 from the rich burn operating mode to the lean burn operating mode.

Incidentally, in this third example embodiment, even when the timing at which the increases or decreases the output ratio of the electric motor 12 is started is delayed or advanced when executing or canceling the rich spike control of the $NO_X$ storage reduction catalyst 69, it is still almost simultaneous with the timing at which the operating mode of the engine 11 is switched. However, when the running state of the vehicle is such that priority is given to the exhaust gas purifying efficiency rather than drivability, the timing at which the increases or decreases of the output ratio of the electric motor 12 is started may be even more delayed or advanced with respect to the timing at which the operating mode of the engine 11 is switched.

FIG. 7 is a time chart showing the change in output ratios of an engine and an electric motor in a hybrid vehicle according to a fourth example embodiment. The overall structure of the hybrid vehicle in this fourth example embodiment is generally the same as that of the hybrid vehicle in the first example embodiment described above. Therefore, the fourth example embodiment will also be described with reference to FIGS. 1 and 4, and members that have the same function as they do in the first example embodiment will be denoted by the same reference numerals and redundant descriptions of those members will be omitted.

In the hybrid vehicle according to the fourth example embodiment, as shown in FIGS. 1 and 4, the main ECU 28 controls the engine 11 via the engine ECU 22, and also controls the electric motor 12 and the generator 13 via the motor ECU 27. That is, the main ECU 28 sets the power distribution ratio between the engine 11 and the electric motor 12 (i.e., a ratio that determines how much of the total power that is output is to be generated by the engine and how much of the total power that is output is to be generated by the electric motor) to achieve maximum efficiency according to the accelerator depression amount and the running state of the vehicle. The engine ECU 22 controls the engine 11 and the motor ECU 27 controls the electric motor 12. Also, in the engine 11 in this example embodiment, the engine ECU 22 can switch the operating mode of the engine 11, according to the operating state of the engine 11, between a lean burn operating mode that realizes stratified-charge combustion with a lean air-fuel ratio, a stoichiometric burn operating mode that realizes homogenous combustion with a stoichiometric air-fuel ratio, and a rich burn operating mode that realizes homogeneous combustion with a rich air-fuel ratio.

In the hybrid vehicle according to this fourth example embodiment, when the operating mode of the engine 11 is switched during a transitional operation of the vehicle, the main ECU 28 increases or decreases the output ratio of the electric motor 12 so that the total output, which is the combined output of the engine 11 and the electric motor 12, is constant with respect to the output required by the driver (i.e., the accelerator depression amount). More specifically, when the operating mode of the engine 11 is switched from the lean burn operating mode to the stoichiometric burn operating mode (or the rich burn operating mode), the main ECU 28 increases the output ratio of the electric motor 12 after first making the speed of the engine 11 constant. Also, when the operating mode of the engine 11 is switched from the stoichiometric burn mode (or the rich burn operating mode) to the lean burn operating mode, the main. ECU 28 decreases the output ratio of the electric motor 12 after first making the speed of the engine 11 constant.

That is, as shown in FIGS. 1, 4, and 7, in the operating mode switching control of the engine 11 in the hybrid vehicle in this example embodiment, when the driver depresses the accelerator pedal while the engine 11 is in the lean burn operating mode, the throttle opening amount increases as the accelerator depression amount increases, which increases the amount of air drawn into the engine 11. As a result, the engine speed increases which increases the engine output. When the operating mode of the engine 11 is switched to the stoichiometric burn operating mode at time $t_1$, the amount of intake air is reduced by decreasing the throttle opening amount which is done by changing an operating parameter such as the ignition timing in order to change the air-fuel ratio. At this time, the engine ECU 22 obtains an estimated engine output by switching from a lean burn operating mode map to a stoichiometric burn operating mode map. Each of these operating mode maps contains an estimated engine output which is prepared in advance. The engine ECU 22 then controls the engine speed so that the estimated engine output approaches a target engine output. However, the adjustment of the output of the engine 11 when the air-fuel ratio is changed temporarily becomes off which tends to result in a shock being generated.

Therefore, at time $t_1$ when the operating mode of the engine 11 is switched to the stoichiometric burn operating mode, the main ECU 28 smoothly changes the total output, which is the combined output of the electric motor 12 and the engine 11, to match the output required by the driver (i.e., the accelerator depression amount) by increasing the output of the electric motor 12 which is done by increasing the output ratio of the electric motor 12, while the engine ECU 22 keeps the throttle opening amount constant to maintain a constant engine speed for a predetermined period of time that is set beforehand.

Then at time $t_2$, when the engine ECU 22 is able to accurately obtain the estimated engine output from the stoichiometric burn operating mode map, it controls the engine speed based on this estimated engine output while the main ECU 28 smoothly changes the total output, which is the combined output of the electric motor 12 and the engine 11, to match the output required by the driver (i.e., the accelerator depression amount) by decreasing the output of the electric motor 12 which is done by decreasing the output ratio of the electric motor 12. Then at time $t_3$, the main ECU 28 keeps the output of the electric motor 12 constant and increases the engine output by increasing the engine speed according to the output required by the driver. As a result, the shock generated when the operating mode of the engine 11 is switched from the lean burn operating mode to the stoichiometric burn operating mode is reduced.

Then when the driver releases the accelerator pedal, the throttle opening amount decreases as the accelerator depression amount decreases, which reduces the amount of intake air. As a result, the engine speed drops so the engine output decreases. Then when the operating mode of the engine 11 is switched from the stoichiometric burn operating mode to the lean burn operating mode at time $t_4$, the throttle opening amount is increased to increase the intake air amount by changing an operating parameter such as the ignition timing in order to change the air-fuel ratio. At this time, the main ECU 28 smoothly changes the total output, which is the combined output of the electric motor 12 and the engine 11, to match the output required by the driver (i.e., the accelerator depression amount) by decreasing the output of the electric motor 12 which is done by decreasing the output ratio of the electric motor 12, while the engine ECU 22 keeps the throttle opening amount constant to maintain a constant engine speed for a predetermined period of time at time $t_4$ when the operating mode of the engine 11 is switched to the lean burn operating mode. The predetermined period of time is set in advance.

Then at time $t_5$, when the engine ECU 22 is able to accurately obtain the estimated engine output from the stoichiometric burn operating mode map, it controls the engine speed based on this estimated engine output while the main ECU 28 smoothly changes the total output, which is the combined output of the electric motor 12 and the engine 11, to match the output required by the driver (i.e., the accelerator depression amount) by increasing the output of the electric motor 12 which is done by increasing the output ratio of the electric motor 12. Then at time $t_6$, the main ECU 28 keeps the output of the electric motor 12 constant and decreases the engine output by reducing the engine speed according to the output required by the driver. As a result, the shock generated when the operating mode of the engine 11 is switched from the stoichiometric burn operating mode to the lean burn operating mode is reduced.

In this way, with the hybrid vehicle according to the fourth example embodiment, when the operating mode of the engine 11 is switched during a transitional operation of the vehicle, the main ECU 28 makes the total output, which is the combined output of the engine 11 and the electric motor 12, match the output required by the driver by increasing the output ratio of the electric motor 12 while the engine ECU 22 keeps the speed of the engine 11 constant.

Therefore, fluctuation in the output of the engine 11 is suppressed when the operating mode of the engine 11 is switched by making the output of the engine 11 constant and decreasing or increasing the output of the electric motor 12, thereby improving drivability. Also, the amount of exhaust gas is reduced by increasing the output ratio of the electric motor 12 when the operating mode of the engine 11 is switched, thereby enabling the exhaust gas purifying efficiency to be improved.

Also, the main ECU 28 increases the output ratio of the electric motor 12 when the operating mode of the engine 11 is switched from the lean burn operating mode to the stoichiometric burn operating mode, and decreases the output ratio of the electric motor 12 when the operating mode of the engine 11 is switched from the stoichiometric burn operating mode to the lean burn operating mode.

Accordingly, when the operating mode of the engine 11 is switched from the lean burn operating mode to the stoichiometric burn operating mode, the amount of exhaust gas, as well as the amount of harmful components in the exhaust gas, increases. Therefore the output ratio of the electric motor 12 is increased and the output ratio of the engine 11 is decreased so the amount of exhaust gas is reduced which enables the exhaust gas purifying efficiency to be improved. On the other hand, when the operating mode of the engine 11 is switched from the stoichiometric burn operating mode to the lean burn operating mode, the amount of exhaust gas, as well as the amount of harmful components in the exhaust gas, decreases. Therefore the output ratio of the electric motor 12 is decreased and the output ratio of the engine 11 is increased so drivability can be improved.

As described above, the hybrid vehicle according to the invention aims to improve drivability by reducing shock generated by a fluctuation in torque when the operating mode is changed. The invention is effective when applied to a hybrid vehicle provided with an engine, regardless of the configuration of that engine.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A hybrid vehicle comprising:
an engine;
an electric motor;
a power transmitting portion, including a planetary gear unit, that transmits output from the engine to a driving wheel and transmits output from the electric motor to the driving wheel;
an electronic control unit (ECU) including an output control portion having instructions, which, when implemented, control an output ratio of the engine and an output ratio of the electric motor using the power transmitting portion according to a running state of the vehicle; and
a $NO_X$ storage reduction catalyst provided in an exhaust passage of the engine;
a three-way catalyst provided upstream, in a direction in which exhaust gas flows, of the $NO_X$ storage reduction catalyst in the exhaust passage of the engine,
wherein the ECU further includes an operating mode switching portion having instructions, which, when implemented, switch an operating mode of the engine between a lean burn operating mode in which an air-fuel ratio of the engine is lean, a stoichiometric burn operating mode in which the air-fuel ratio of the engine is near a stoichiometric air-fuel ratio, and a rich burn operating mode in which the air-fuel ratio of the engine is rich,
wherein the output control portion has further instructions, which, when implemented, increase the output ratio of the electric motor and delays a timing at which an increase of the output of the electric motor is started with respect to a timing at which the operating mode is switched by a predetermined period of time, the predetermined period of time being an amount of time required for exhaust gas for recovering the $NO_X$ storage reduction catalyst to reach the $NO_X$ storage reduction catalyst, when the operating mode switching portion executes a rich spike control that reduces $NO_X$ stored in the $NO_X$ storage reduction catalyst and recovers the $NO_X$ storage reduction catalyst by switching the operating mode to the rich burn operating mode, and wherein the output control portion has further instructions, which, when implemented, make a speed of the engine constant for a predetermined period of time and selectively increase or decrease the output of the electric motor when the operating mode is switched by the operating mode switching portion.

2. The hybrid vehicle according to claim 1, wherein the output control portion has further instructions, which, when implemented, increase the output of the electric motor while keeping the speed of the engine constant when the operating mode is switched from the lean burn operating mode to the stoichiometric burn operating mode by the operating mode switching portion.

3. The hybrid vehicle according to claim 1, wherein the output control portion has further instructions, which, when implemented, decrease the output of the electric motor while keeping the speed of the engine constant when the operating mode is switched from the stoichiometric burn operating mode to the lean burn operating mode by the operating mode switching portion.

4. The hybrid vehicle according to claim 1, wherein the output control portion has further instructions, such that, when implemented, prior to the operating mode being switched from the lean burn operating mode to the stoichiometric burn operating mode by the operating mode switching portion, the output control portion makes a change in output of the engine and the electric motor by decreasing the output of the electric motor and increasing the output of the engine, while keeping the speed of the engine constant, and
wherein the output control portion has further instructions, such that, when implemented, when the change in output of the engine and the electric motor is completed, the output control portion switches the operating mode from the lean burn operating mode to the stoichiometric burn operating mode by the operating mode switching portion.

5. The hybrid vehicle according to claim 1, wherein the output control portion has further instructions, such that, when implemented, after the operating mode is switched from the stoichiometric burn operating mode back to the lean burn operating mode by the operating mode switching portion, the output control portion increases the output of the electric motor and decreases the output of the engine, while keeping the speed of the engine constant.

6. A control method of a hybrid vehicle including an engine; an electric motor; a power transmitting portion that transmits output from the engine to a driving wheel and that transmits output from the electric motor to the driving wheel; a $NO_X$ storage reduction catalyst provided in an exhaust passage of the engine; a three-way catalyst provided upstream, in a direction in which exhaust gas flows, of the $NO_X$ storage reduction catalyst in the exhaust passage of the engine; and an output control portion that controls an output ratio of the engine and an output ratio of the electric motor using the power transmitting portion according to a running state of the vehicle, the output control portion switching an operating mode of the engine between a lean burn operating mode in which an air-fuel ratio of the engine is lean, a stoichiometric burn operating mode in which the air-fuel ratio of the engine is near a stoichiometric air-fuel ratio, and a rich burn operating mode in which the air-fuel ratio of the engine is rich, the control method comprising:

executing rich spike control that reduces $NO_X$ stored in the $NO_X$ storage reduction catalyst and recovers $NO_X$ storage reduction catalyst by switching the operating mode to the rich burn operating mode; and when executing the rich spike control, increasing the output ratio of the electric motor and delaying, by a predetermined period of time, a timing at which an increase of the output of the electric motor is started with respect to a timing at which the operating mode is switched, the predetermined period of time being an amount of time required for exhaust gas for recovering the $NO_X$ storage reduction catalyst to reach the $NO_X$ storage reduction catalyst, and when the operating mode is switched, making a speed of the engine constant for a predetermined period of time and selectively increasing or decreasing the output of the electric motor via the output control portion.

* * * * *